United States Patent
Kitamura et al.

(10) Patent No.: US 7,105,802 B2
(45) Date of Patent: Sep. 12, 2006

(54) TORQUE MEASURING DEVICE FOR ROTATING BODY INCORPORATING ONE LIGHT EMITTING ELEMENT AT ROTATIONAL AXIS

(75) Inventors: Atsushi Kitamura, Shizuoka-ken (JP); Shigeyuki Adachi, Shizuoka-ken (JP); Sawa Tanabe, Shizuoka-ken (JP)

(73) Assignee: Minebea Co., Ltd., Nagano-Ken (JP)

( * ) Notice: Subject to any disclaimer, the term of this patent is extended or adjusted under 35 U.S.C. 154(b) by 0 days.

(21) Appl. No.: 11/198,417

(22) Filed: Aug. 5, 2005

(65) Prior Publication Data

US 2006/0043273 A1    Mar. 2, 2006

(30) Foreign Application Priority Data

Aug. 25, 2004   (JP) .............................. 2004-244589

(51) Int. Cl.
*G01D 5/34* (2006.01)
*G01L 3/02* (2006.01)

(52) U.S. Cl. .............................. 250/231.13; 73/862.324

(58) Field of Classification Search ........... 250/231.13, 250/231.14, 231.16, 237 G; 356/614–615; 73/862.06, 862.324, 862.325; 341/13
See application file for complete search history.

(56) References Cited

U.S. PATENT DOCUMENTS 6,800,843 B1 * 10/2004 Horton .................. 250/231.13
6,834,558 B1 * 12/2004 Anderson ............... 73/862.323
6,907,794 B1 *  6/2005 Arai ....................... 73/862.324

FOREIGN PATENT DOCUMENTS

JP    2002-022566    1/2002

\* cited by examiner

*Primary Examiner*—Kevin Pyo
(74) *Attorney, Agent, or Firm*—Fay, Sharpe, Fagan, Minnich & McKee, LLP

(57) ABSTRACT

A torque measuring device for a rotating body includes: a rotary section integrally including a first flange, a second flange, and a hollow cylinder disposed between the first and second flanges; a plurality of torque detectors disposed at the inner circumference of the hollow cylinder; and a light receiving unit. The torque measuring device described above further includes: a light emitting element disposed at the rotational center axis of the rotary section and adapted to emit light based on an output from each of the torque detectors thereby sending an optical signal; a light branching unit to branch the optical signal into a plurality of subsequent signals; and a plurality of passages formed in the rotary section and allowing respective subsequent signals to exit out the rotary section and to be received by the light receiving unit.

6 Claims, 8 Drawing Sheets

TORQUE MEASURING DEVICE FOR ROTATING BODY INCORPORATING ONE LIGHT EMITTING ELEMENT AT ROTATIONAL AXIS

PRIORITY TO BE CLAIMED

This application claims priority from Japanese Patent Application No. 2004-244589, filed Aug. 25, 2004.

BACKGROUND OF THE INVENTION

1. Field of the Invention

The present invention relates to a torque measuring device for a rotating body, which is to measure a torque of a rotating body without getting in touch with its rotating portion.

2. Description of the Related Art

A torque measuring device for a rotating body (hereinafter, referred to simply as "torque measuring device" as appropriate) is set between a driving shaft powered and a driven shaft loaded, and measures a rotating torque in a non-contact manner. Such a torque measuring device is disclosed in, for example, Japanese Patent Application Laid-Open No. 2002-22566, which is used, for example, to measure a rotating torque between a measurement roller and a brake system in a chassis dynamo rotated by a wheel of a vehicle.

FIG. 1 is a front view of a conventional torque measuring device 50, and FIG. 2 is a side view (partly cut away and sectioned) of the torque measuring device 50 of FIG. 1. As shown in FIGS. 1 and 2, the conventional torque measuring device 50 includes: a rotary section 51 rotatably disposed between a driving shaft 91 powered and a driven shaft 93 loaded; and a stationary section 55 fixedly disposed so as to surround the rotary section 51. The rotary section 51 integrally includes: a first flange 52 to be fixedly jointed to a driving shaft flange 92 of the driving shaft 91; a second flange 54 to be fixedly jointed to a driven shaft flange 94 of the driven shaft 93; and a hollow cylinder 53 having a hollow 59, and having the first and second flanges 52 and 54 formed respectively on both edges thereof. The stationary section 55 includes: an annulus 56 located so as to surround the second flange 54; and a chassis 57 to which the annulus 56 is fixedly attached via attaching members 58.

A primary coil 87 is provided at the inner circumference of the annulus 56 disposed outside the second flange 54, and a secondary coil 88 is provided at the outer circumference of the second flange 54. The primary and secondary coils 87 and 88 in combination constitute a rotary transformer 89, thereby supplying electric power to the rotary section 51.

Torque detectors 61 as strain gauges are provided at the inner circumference of the hollow cylinder 53, a plurality of light emitting elements 67a to 67n, which are adapted to emit light according to an output from each of the torque detectors 61 thereby outputting an optical signal, are provided at the outer circumference of the second flange 54 so as to be arrayed along the secondary coil 88, a light receiving fiber 71 for receiving the optical signal from the light emitting elements 67a to 67n is provided along the primary coil 87 on the inner circumference of the annulus 56, and optical-electrical signal converters (not shown) for converting the optical signal into an electrical signal are provided at the ends of the light receiving fiber 71.

In the torque measuring device 50, when the driving shaft 91 rotates, the output from each of the torque detectors 61 is carried via the light emitting elements 67a to 67n and the light receiving fiber 71 to the optical-electrical signal converters (not shown) and is thereby detected, thus measuring a rotating torque.

As described above, the torque measuring device 50 is set between the driving shaft 91 and the driven shaft 93 and is adapted to measure a rotating torque in a non-contact manner. The torque measuring device 50, however, has the disadvantage that due to provision of the multiple emitting elements 67a to 67n, a large amount of electricity is required for the aerial power supply operation by the rotary transformer 89 constituted by the primary and secondary coils 87 and 88, and therefore the number of the coils must be increased thus increasing the burden at the electric circuit.

Also, due to the influence of variation resulting from the inter-individual variability of the plurality of light emitting elements 67a to 67n, such as difference in light amount, directivity characteristic, and the like, the crest value of the optical signal received at the stationary section 51 is varied causing adverse effects on the electrical property.

And, the light emitting elements 67a to 67n are provided at the outer circumference of the rotary section 51 and therefore suffer a large centrifugal effect due to the rotation of the rotary section 51. When the rotary section 51 rotates at a high speed, the light emitting elements 67a to 67n can be damaged resulting in deterioration of reliability.

SUMMARY OF THE INVENTION

The present invention has been made in light of the problems described above and has as an object to provide a torque measuring device for a rotating body, in which adverse effects resulting from provision of a plurality of light emitting elements are eliminated so as to ensure a stable torque measurement.

In order to achieve the object described above, according to an aspect of the present invention, a torque measuring device for a rotating body includes: a rotary section integrally including a first flange disposed at a driving side, a second flange disposed at a driven side, and a hollow cylinder disposed between the first and second flanges; a plurality of torque detectors disposed at the inner circumference of the hollow cylinder; and a light receiving unit. The torque measuring device described above further includes: a light emitting element disposed at the rotational center axis of the rotary section and functioning to emit light based on an output from each of the torque detectors thereby sending an optical signal; a light branching unit to branch the optical signal into a plurality of subsequent signals; and a plurality of passages formed in the rotary section and allowing respective subsequent signals to exit out the rotary section and to be received by the light receiving unit. Since the light branching unit is adapted to branch the optical signal from the light emitting element into multiple subsequent signals, the torque measuring device does not have to incorporate a plurality of light emitting elements but only one light emitting element disposed at the rotational center axis.

In the aspect of the present invention, the light branching unit may be constituted by either a pyramidal mirror or a conical mirror. Thus, light can be duly branched by a simple structure.

In the aspect of the present invention, the light branching unit may further include a two-dimensional diffraction grating. Thus, light can be duly branched by a simple structure and efficiently.

In the aspect of the present invention, the light branching unit may include a plurality of optical fibers. This also enables light to be branched by a simple structure.

In the aspect of the present invention, the light receiving unit may include a light guide rod to receive the subsequent signals, which has an optical path converting means formed on a surface thereof. This enables light to be efficiently received.

In the aspect of the present invention, the light receiving unit may be mounted in a chassis disposed outside the rotary section. This allows for flexibility in structure.

Thus, according to the present invention, adverse effects, which result from provision of a plurality of light emitting elements, are eliminated, and a stable torque measurement is ensured.

Specifically, since the light branching unit is adapted to branch one optical signal into a plurality of subsequent signals, thus requiring only one light emitting element to output one optical signal, and since the one optical signal is effectively utilized to be branched into multiple subsequent signals, power consumption is reduced and therefore the number of turns on a coil is also reduced thus reducing burden at the electrical circuit.

Also, since only one light emitting element is employed, the variation that results from the inter-individual variability of multiple light emitting elements is not involved, and therefore the crest value of the optical signal received at the stationary section is prevented from varying, thus eliminating adverse effects on the electrical property.

And, since the one light emitting element is positioned at the rotational center axis of the rotary section, rather than the outer circumference thereof, the light emitting element is prevented from suffering the centrifugal effect.

DETAILED DESCRIPTION OF THE PREFERRED EMBODIMENTS

Preferred embodiments of the present invention will hereinafter be described with the accompanying drawings.

Figure 3:
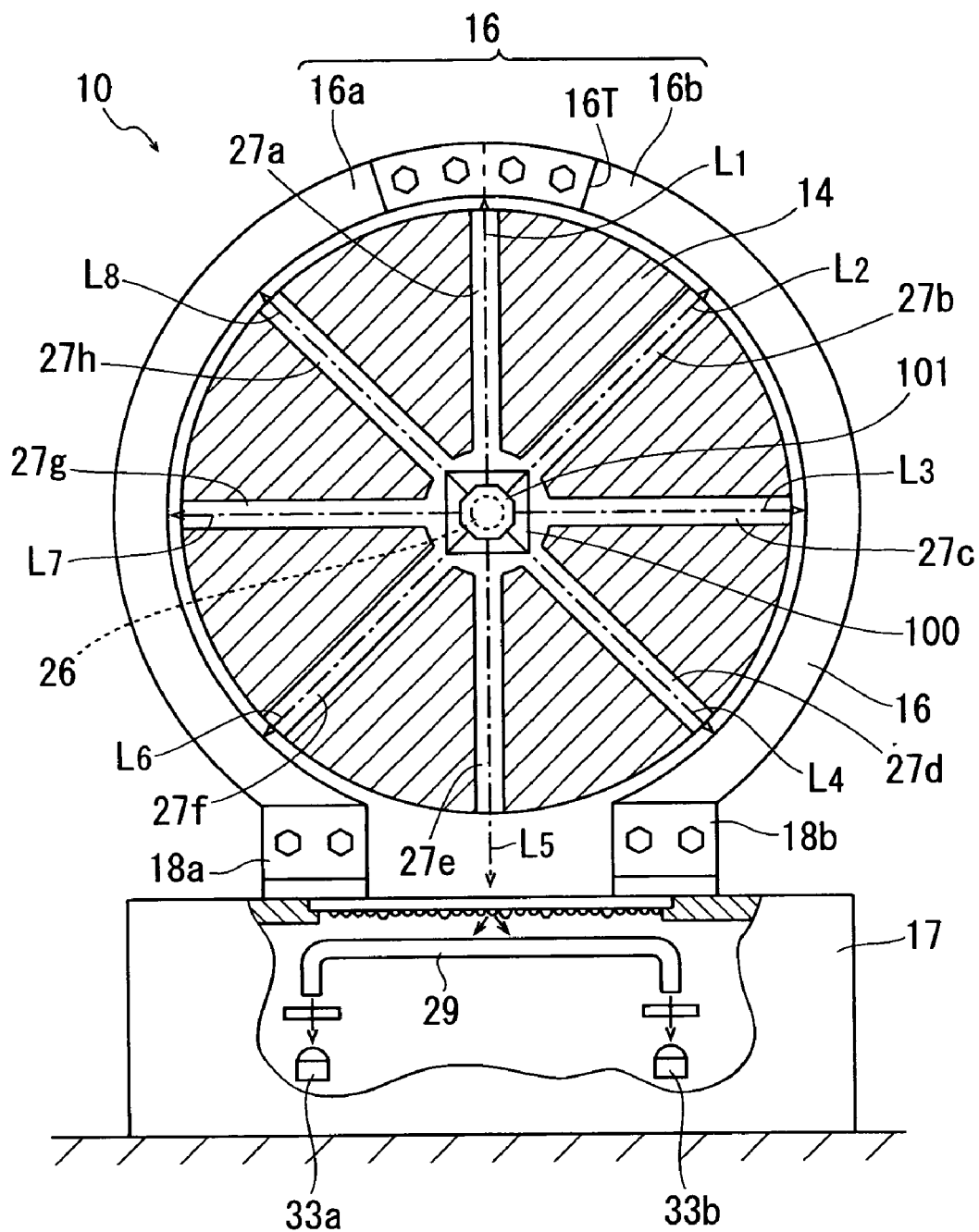
FIG. 3 is a front view of a torque measuring device for a rotating body, according to a first embodiment of the present invention.
Figure 4:
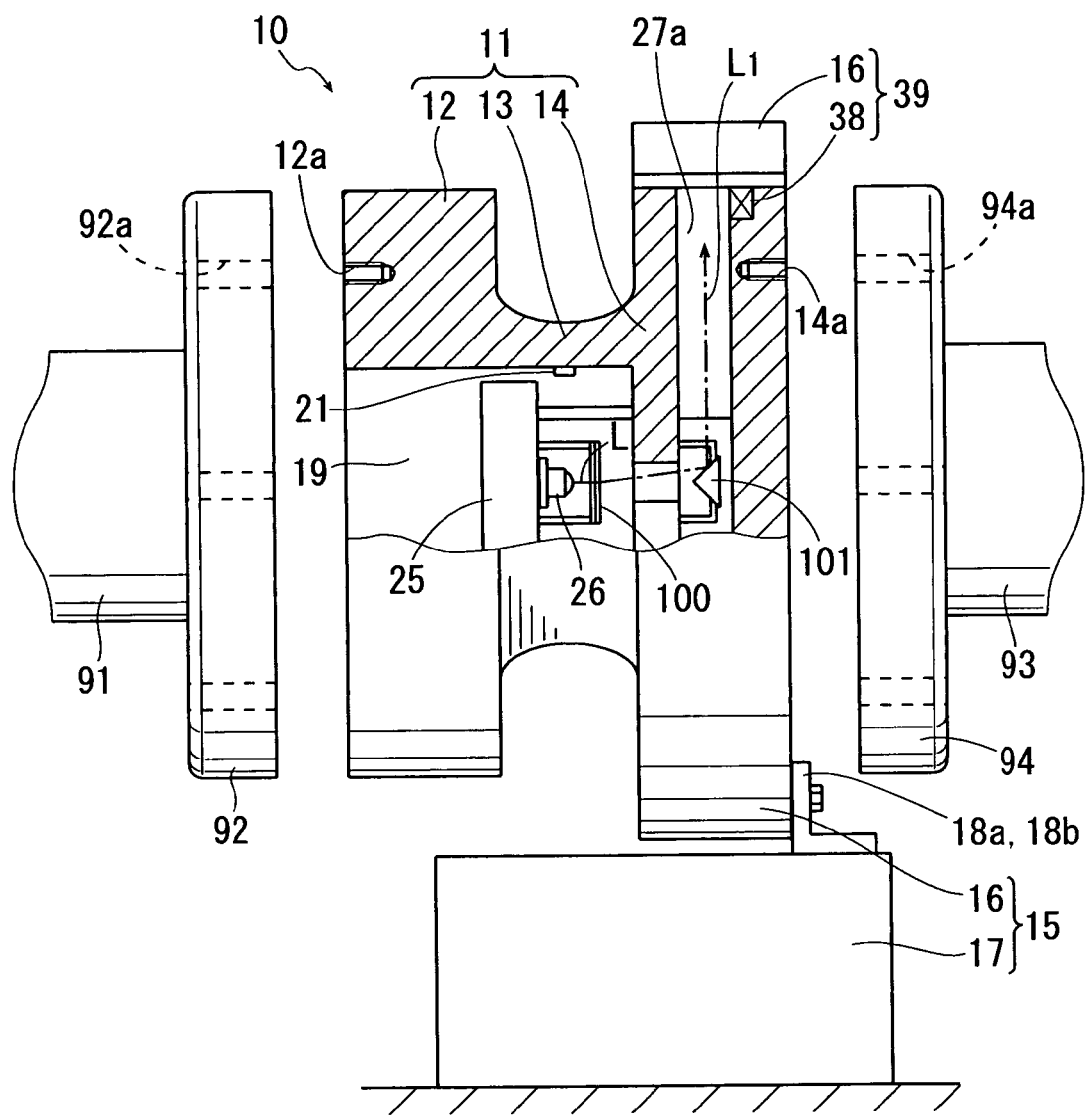
FIG. 4 is a side view (partly cut away and sectioned) of the torque measuring device for a rotating body shown in FIG. 3.

Referring to FIGS. 3 and 4, a torque measuring device 10 for a rotating body, according to a first embodiment, includes a rotary section 11 rotatably disposed between a driving shaft 91 powered and a driven shaft 93 loaded, and a stationary section 15 fixedly disposed so as to surround the rotary section 11.

The rotary section 11 integrally comprises: a first flange 12 to be fixedly jointed to a driving shaft flange 92 of the driving shaft 91; a second flange 14 to be fixedly jointed to a driven shaft flange 94 of the driven shaft 93; and a hollow cylinder 13 having a hollow 19, and having the first and second flanges 12 and 14 formed respectively on both edges thereof. The stationary section 15 comprises: an annulus 16 located so as to surround the second flange 14; and a chassis 17 to which the annulus 16 is fixedly attached via attaching members 18a and 18b.

The first flange 12 is fixed to the driving shaft flange 92 by screws (not shown) going through lug-holes 92a of the driving shaft flange 92 and engaging into screw-holes 12a of the first flange 12, and the second flange 14 is fixed to the driven shaft flange 94 by screws (not shown) going through lug-holes 94a of the driven shaft flange 94 and engaging into screw-holes 14a of the second flange 14. When the driving shaft 91 rotates, the hollow cylinder 13 is twisted by the first and second flanges 12 and 14 and thus distorted.

The annulus 16 consists of two semi-annulus sections 16a and 16b which have their respective upper ends fixedly attached to each other by means of a conductive connecting member 16T so as to be electrically conductive to each other, and which have their respective lower ends fixedly attached to the attaching members 18a and 18b fixed to the chassis 17 so as to be physically and electrically isolated from each other. Thus, the annulus 16 is shaped into an interrupted loop with an open mouth and fixedly disposed in an insulating manner, and therefore constitutes a primary coil while it can be easily mounted and dismounted. The primary coil thus constituted and a secondary coil 38 provided at the outer circumference of the second flange 14 make up a rotary transformer 39 thereby supplying electric power to the rotary section 11.

Torque detectors 21 as strain gauges are provided at the inner circumference of the hollow cylinder 13, and a mounting board 25 on which electronic components for the rotary section 11 is mounted is provided in the hollow 19 of the hollow cylinder 13. Also, a light emitting element 26, which emits light by outputs from the torque detectors 21 so as to send an optical signal L, is provided in the hollow 19 of the hollow cylinder 13 at a location corresponding to the rotation axis of the driving shaft 91. And, a diffraction grating 100 is provided on the optical path of the optical signal L from the light emitting element 26 (i.e., on the rotation axis of the driving shaft 91) so as to branch the optical signal L into subsequent signals L1 to L8, and a pyramidal mirror 101 is also provided on the same axis so as to reflect the subsequent signals L1 to L8. Thus, the diffraction grating 100 and the pyramidal mirror 101 constitute an optical branching unit.

A plurality (eight in FIG. 3) of passages 27a to 27h are formed in the second flange 14 so as to radially extend from the central hub opening at an equi-angular distance thus forming a wheel spoke pattern, and the subsequent signals L1 to L8 generated by the diffraction grating 100 and reflected by the pyramidal mirror 101 are adapted to pass through the passages 27a to 27n, respectively, and to impinge on a light receiving unit to be described later.

In the present embodiment, the optical signal L from the light emitting element 26 is branched into eight subsequent signals L1 to L8 which are then reflected respectively at eight reflection faces 101a to 101h (refer to FIG. 5) of the pyramidal mirror 101 so as to pass through the passages 27a to 27h. The present invention is not limited to this arrangement, but passages may be provided in a number different from eight, wherein the optical signal L from the light emitting element 26 is branched into subsequent signals in a number equal to the number of the passages, and also the pyramidal mirror 101 has its reflection faces provided in the same number.

A light receiving fiber 29 to receive the subsequent signals L1 to L8 having passed through the passages 27a to 27h is provided in the chassis 17 with its both end portions bent up for a space effective installation. Optical-electric signal converters 33a and 33b, which receive an optical signal and convert it into an electrical signals, are disposed so as to face respectively both end faces of the light receiving fiber 29. Thus, the aforementioned light receiving unit includes the light receiving fiber 29 and the optical-electrical signal converters 33a and 33b.

Figure 5:
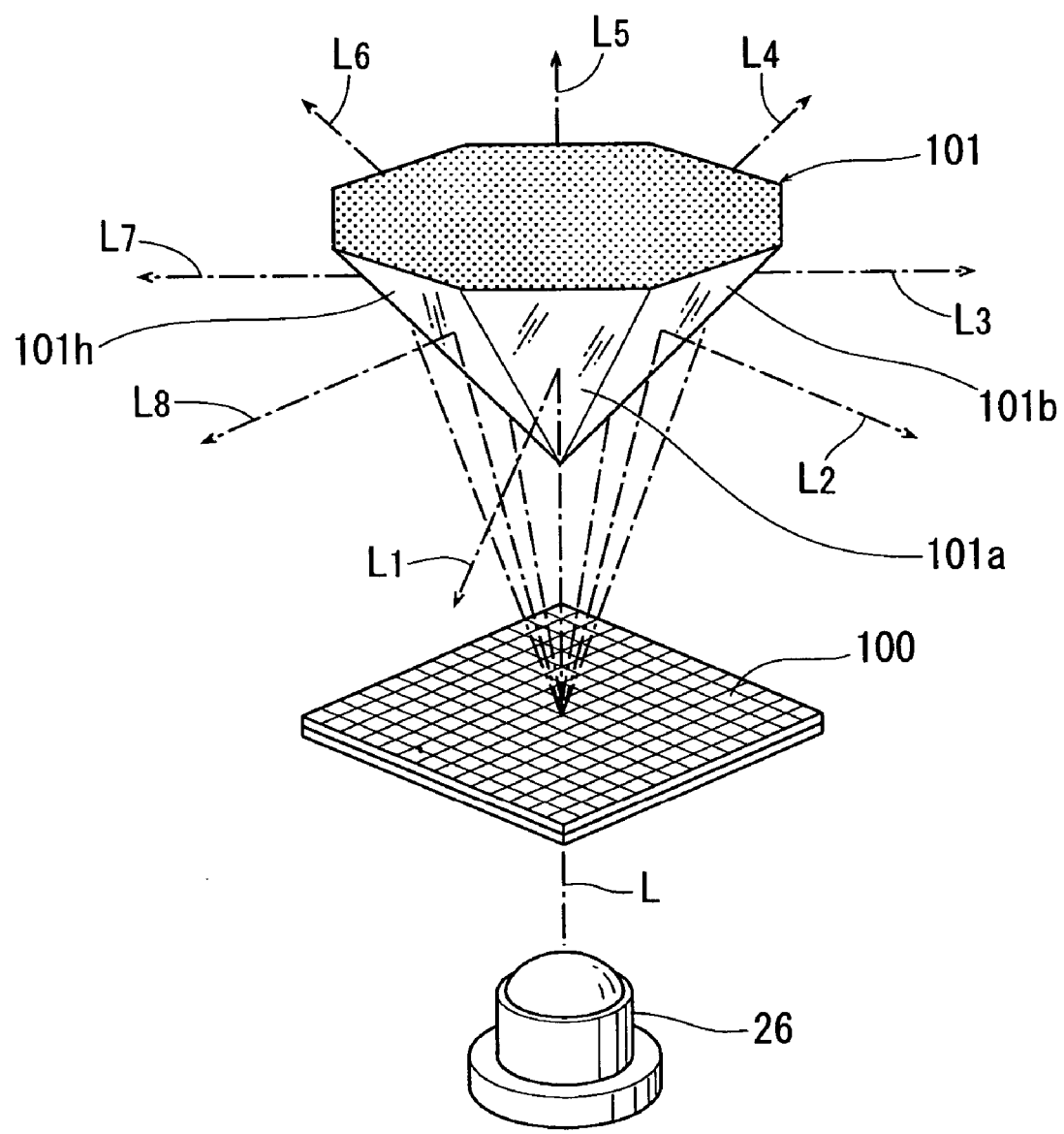
FIG. 5 is a perspective view of a light branching unit of the torque measuring device for a rotating body shown in FIG. 3.

The operation of the torque measuring device 10 according to the first embodiment will be described with reference to FIGS. 5, 6A, 6B, and 7. In FIG. 5, the light emitting element 26, the diffraction grating 100, and the pyramidal mirror 101 are arranged vertically, though arranged horizontally in a practical use as shown in FIG. 4.

Figure 6A:
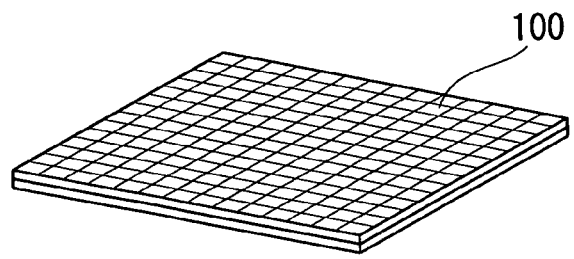
FIG. 6A is a perspective view of a diffraction grating of the optical branching unit shown in FIG. 5.
Figure 6B:
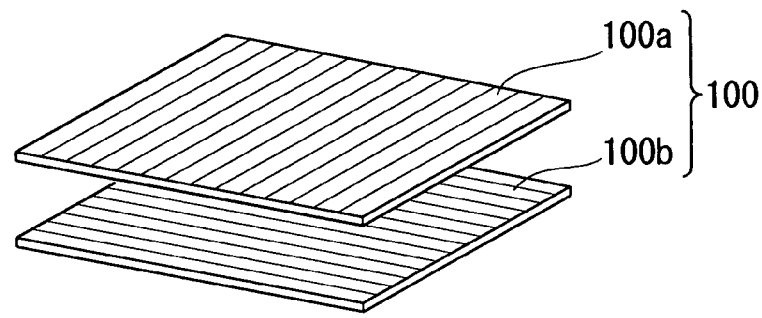
FIG. 6B is an exploded view of FIG. 6A.
Figure 7:
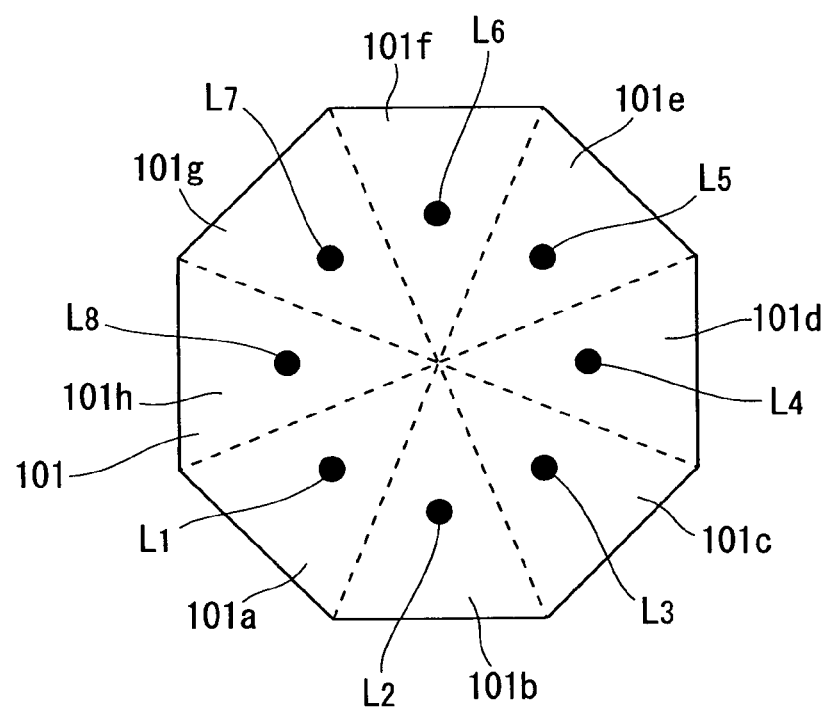
FIG. 7 is a plan view (seen from the bottom side) of a pyramidal mirror of the optical branching unit shown in FIG. 5.

Referring to FIG. 5, the optical signal L from the light emitting element 26 is branched into the subsequent signals L1 to L8 by the diffraction grating 100 which is, for example, of a two-dimensional structure, where, as shown in FIGS. 6A and 6B, a first diffraction grating 101a having grooves (or steps, slits, and the like) extending in a first direction is superposed on a second diffraction grating 101b having grooves (or steps, slits, and the like) extending in a second direction different from the first direction. Then, the subsequent signals L1 to L8 are reflected respectively at the reflection faces 101a to 101h of the pyramidal mirror 101 so as to go through the passages 27a to 27h, respectively, as shown in FIG. 3. During the rotation of the second flange 14 in which the passages 27a to 27h are formed at an equiangular distance, the subsequent signals L1 to L8 exiting out the passages 27a to 27h are received sequentially by the light receiving fiber 29, transmitted through the light receiving fiber 29 in both directions, and effectively detected by the optical-electrical signal converters 33a and 33b. The torque measuring device 10 further includes a torque calculating unit (not shown) that calculates a torque value based on the detection result by the optical-electrical signal converters 33a and 33b.

In the first embodiment, the optical signal L from the light emitting element 26 is first branched by the diffraction grating 100 and then made incident on the pyramidal mirror 101. The present invention is not limited to this arrangement, but the optical signal L from the light emitting element 26 may be made incident on the center (apex) of the pyramidal mirror 101 or a conical mirror directly or via a lens so as to be branched.

A second embodiment of the present invention will be described with reference to FIGS. 8 and 9. Since the second embodiment differs from the first embodiment only in structure of a light branching unit, the other portions than the light branching unit are denoted by the same reference numerals, and a detailed description thereof will be omitted below.

Figure 8:
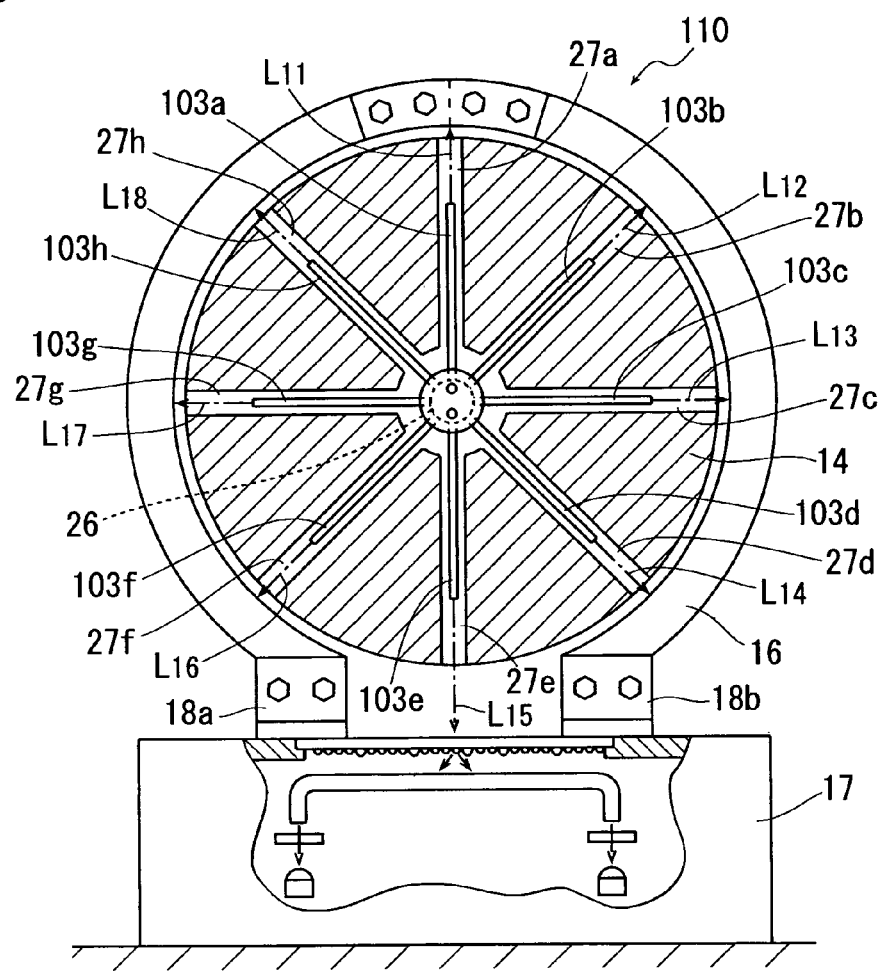
FIG. 8 is a front view of a torque measuring device for a rotating body, according to a second embodiment of the present invention.
Figure 9:
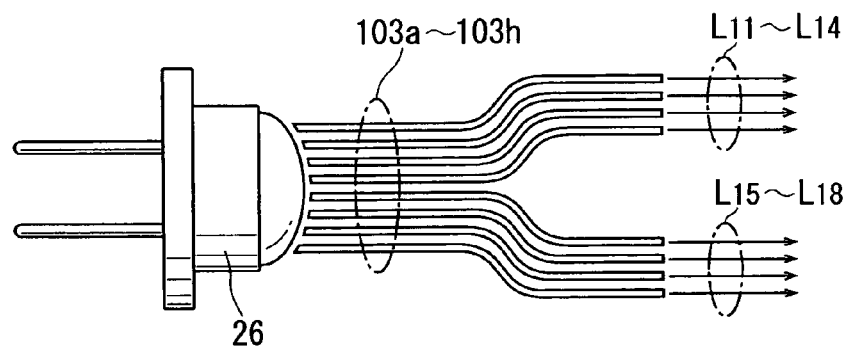
FIG. 9 is a side view of an optical branching unit of the torque measuring device for a rotating body shown in FIG. 8.

Referring to FIGS. 8 and 9, in a torque measuring device 110 for a rotating body, according to the second embodiment of the present invention, a light branching unit is constituted by a plurality (eight in the figures) of optical fibers 103a to 103h provided in a number equal to the number of passages 27a to 27h. That is to say, an optical signal from a light emitting element 26, upon entering the optical fibers 103a to 103h, is branched into subsequent signals L11 to L18. The optical fibers 103a to 103h are installed through the passages 27a to 27h, respectively, whereby the subsequent signals L11 to L18 passing through the optical fibers 103a to 103h, respectively, are to pass through the passages 27a to 27h, respectively, so as to exit out. In this connection, the optical fibers 103a to 103h are not limited to an ordinary optical fiber formed of a core and a cladding layer but may alternatively be a linear optical fiber formed of a single refractive material as long as light is duly transmitted from one end to the other end thereof.

Figure 1:
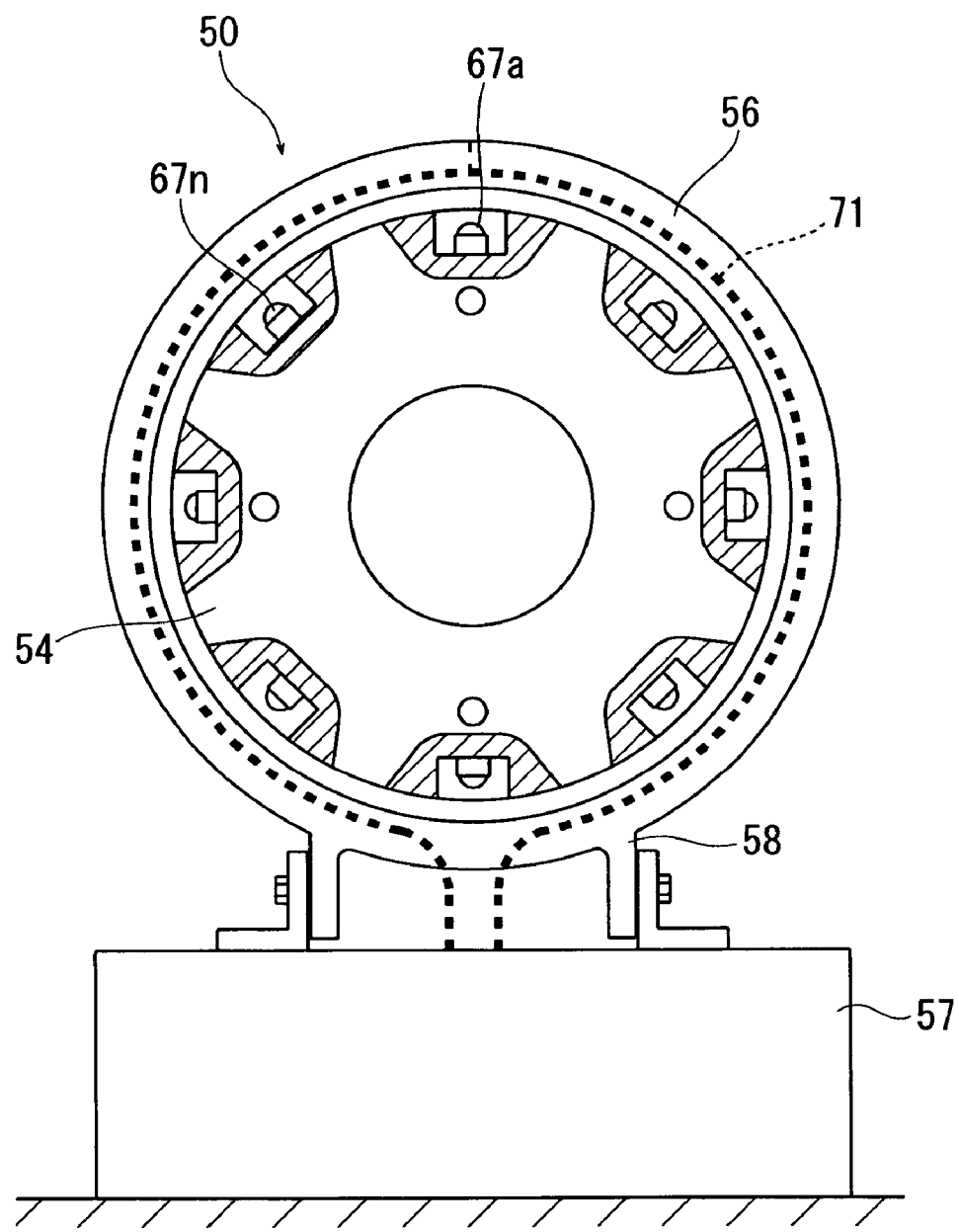
FIG. 1 is a front view of a conventional torque measuring device for a rotating body.
Figure 2:
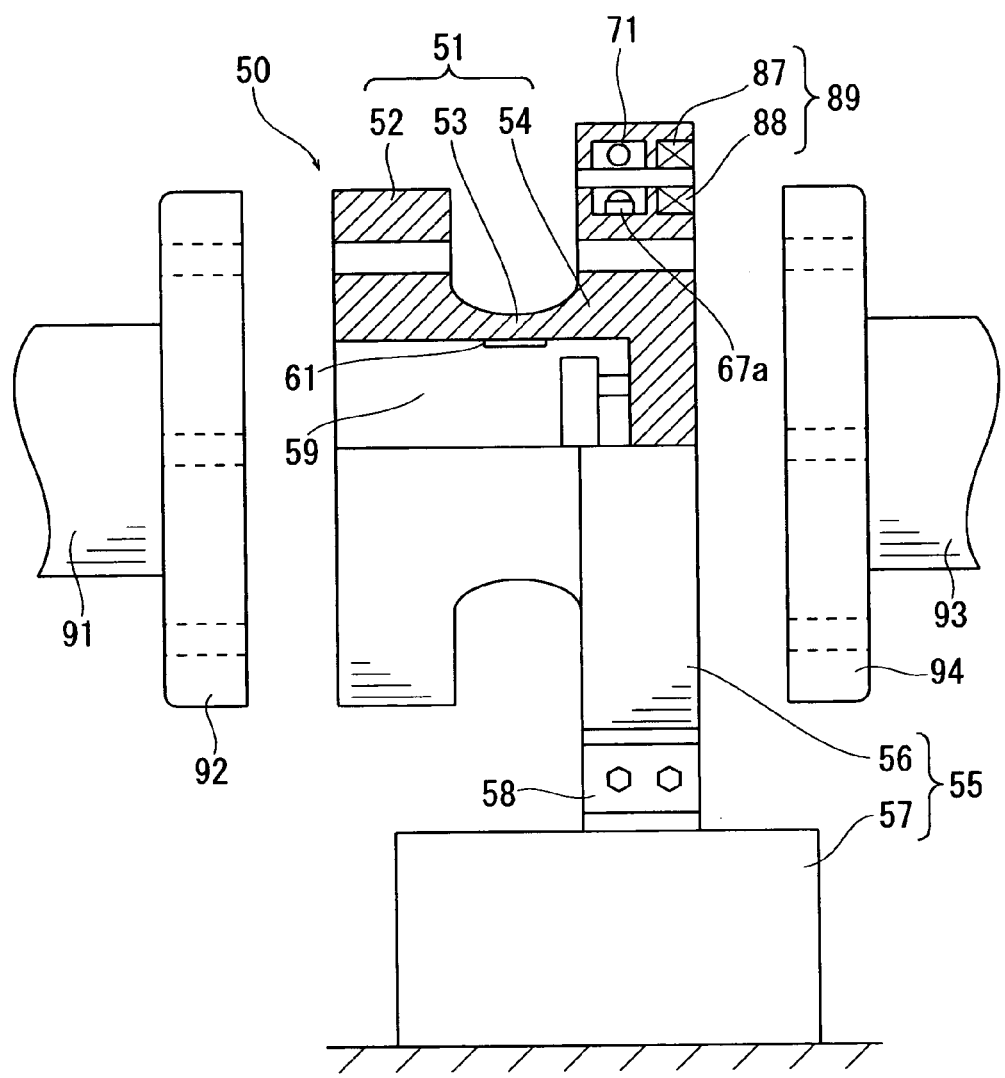
FIG. 2 is a side view (partly cut away and sectioned) of the conventional torque measuring device for a rotating body shown in FIG. 1.

In the above-described embodiments shown in FIGS. 3 and 8, the light receiving unit is constituted by the optical fiber 29 and the optical-electrical signal converters 33a and 33b disposed inside the chassis 17. The present invention is not limited to this structure but may alternatively incorporate such a light receiving unit as disclosed in the aforementioned Japanese Patent Laid-Open No. 2002-22566 (refer to FIG. 1 herein). Specifically, an optical fiber as a light receiving fiber may be provided at the inner circumference of the annulus 16 so as to surround and face the outer circumference of the second flange 14 with its both end portions reaching into the chassis 17, and two optical-electrical signal converters are disposed inside the chassis 17 so as to face respectively both end faces of the optical fiber.

Figure 10:
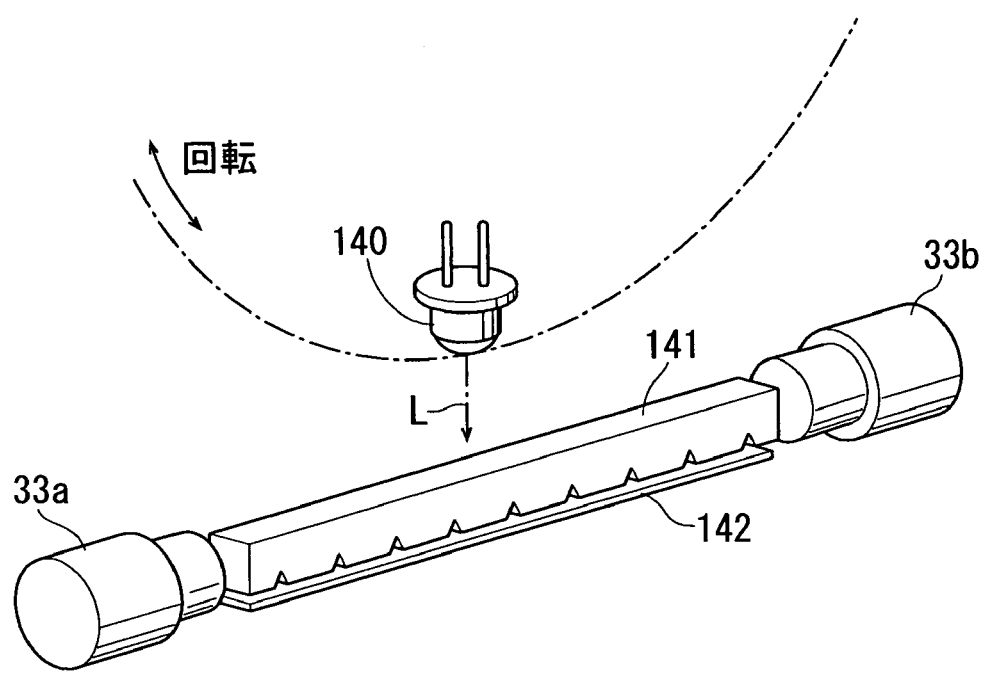
FIG. 10 is a perspective view of a light receiving unit as a reference example.

Also, the present invention may alternatively incorporate such a light receiving unit as proposed by the present inventors in Japanese Patent Application No. 2004-140815, which will hereinafter be referred to as a reference example and explained below with reference to FIG. 10. Referring to FIG. 10, a light guide rod 141 is provided in place of the light receiving fiber 29 shown in FIGS. 3 and 8, and two optical-electrical signal converters 33a and 33b are disposed so as to face respectively both end faces of the light guide rod 141. In the reference example, an optical signal L from a light emitting element 140 impinges on a light entrance surface of the light guide rod 141, enters the light guide rod 141, and is guided so as to travel through the guide rod 141 in both directions and to exit out both end faces of the light guide rod 141, and respective guided optical signals are received by the optical-electrical converters 33a and 33b and converted thereby into electrical signals thus performing signal detection. The light guide rod 141 is a square column formed of a transparent material, has a plurality of grooves (prisms) as an optical path converting means formed on a surface thereof opposite to the light entrance surface. The optical path converting means may be formed on the light entrance surface, and a light reflecting plate 142 may be disposed at the surface of the light guide rod 141 opposite to the light entrance surface. The light receiving unit described above as the reference example is adapted to effectively receive the optical signal L.

While the present invention has been illustrated and explained with respect to specific embodiments thereof, it is to be understood that the present invention is by no means limited thereto but encompasses all changes and modifications that will become possible within the scope of the appended claims.

What is claimed is:

1. A torque measuring device for a rotating body, the device comprising:
   a rotary section integrally comprising a first flange disposed at a driving side, a second flange disposed at a driven side, and a hollow cylinder disposed between the first and second flanges;
   a plurality of torque detectors disposed at an inner circumference of the hollow cylinder;
   a light emitting element disposed at a rotational center axis of the rotary section, and functioning to emit light based on an output from each of the torque detectors thereby sending an optical signal;
   a light branching unit to branch the optical signal into a plurality of subsequent signals;
   a plurality of passages formed in the rotary section, the passages allowing respective subsequent signals to exit out the rotary section; and
   a light receiving unit to receive the subsequent signals exiting out the rotary section.

2. A torque measuring device for a rotating body, according to claim 1, wherein the light branching unit comprises one of a pyramidal mirror and a conical mirror.

3. A torque measuring device for a rotating body, according to claim 2, wherein the light branching unit further comprises a two-dimensional diffraction grating.

4. A torque measuring device for a rotating body, according to claim 1, wherein the light branching unit comprises a plurality of optical fibers.

5. A torque measuring device for a rotating body, according to claim 1, wherein the light receiving unit comprises a light guide rod to receive the subsequent signals, the light guide rod having an optical path converting means formed on a surface thereof.

6. A torque measuring device for a rotating body, according to claim 1, wherein the light receiving unit is mounted in a chassis disposed outside the rotary section.

* * * * *